United States Patent
Dally (10) Patent No.: US 9,287,778 B2
(45) Date of Patent: Mar. 15, 2016

(54) CURRENT PARKING RESPONSE TO TRANSIENT LOAD DEMANDS

(71) Applicant: NVIDIA Corporation, Santa Clara, CA (US)

(72) Inventor: William James Dally, Los Altos Hills, CA (US)

(73) Assignee: NVIDIA Corporation, Santa Clara, CA (US)

(*) Notice: Subject to any disclaimer, the term of this patent is extended or adjusted under 35 U.S.C. 154(b) by 575 days.

(21) Appl. No.: 13/647,202

(22) Filed: Oct. 8, 2012

(65) Prior Publication Data

US 2014/0097813 A1   Apr. 10, 2014

(51) Int. Cl.
  *H02M 3/158* (2006.01)
  *H02M 1/15* (2006.01)
  *H02M 3/156* (2006.01)

(52) U.S. Cl.
  CPC ............... *H02M 3/158* (2013.01); *H02M 1/15* (2013.01); *H02M 3/1588* (2013.01); *H02M 2003/1566* (2013.01); *Y02B 70/1425* (2013.01)

(58) Field of Classification Search
  CPC ............. H02M 1/15; H02M 3/156; H02M 2003/1566; H02M 3/1582; H02M 3/1588; H02M 3/158
  See application file for complete search history.

(56) References Cited

U.S. PATENT DOCUMENTS

| | | | |
|---|---|---|---|
| 6,215,286 B1* | 4/2001 | Scoones et al. | 323/222 |
| 7,786,709 B2 | 8/2010 | Lawson et al. | |
| 7,863,872 B2 | 1/2011 | Chiu | |
| 8,273,490 B2 | 9/2012 | Umayahara et al. | |
| 8,283,896 B1* | 10/2012 | Goluszek et al. | 320/145 |
| 2005/0083736 A1* | 4/2005 | Fukui et al. | 365/185.18 |
| 2008/0055940 A1 | 3/2008 | Lawson et al. | |
| 2008/0136390 A1* | 6/2008 | Briere | 323/282 |
| 2008/0219032 A1* | 9/2008 | Stancu et al. | 363/21.01 |
| 2009/0027925 A1* | 1/2009 | Kanouda et al. | 363/21.13 |
| 2009/0146623 A1* | 6/2009 | de Cremoux et al. | 323/271 |
| 2009/0167261 A1* | 7/2009 | Trochut | 323/234 |
| 2009/0295343 A1 | 12/2009 | Chiu | |
| 2010/0045254 A1* | 2/2010 | Grant | 323/283 |

(Continued)

FOREIGN PATENT DOCUMENTS

| | | |
|---|---|---|
| DE | 112008003489 T5 | 11/2010 |
| WO | 0169768 A1 | 9/2001 |
| WO | WO 2012090449 A1 * | 7/2012 |

OTHER PUBLICATIONS

Examination Report from European Application No. 10 2013 219 793.4, dated Aug. 4, 2014.

(Continued)

*Primary Examiner* — Fred E Finch, III
(74) *Attorney, Agent, or Firm* — Zilka-Kotab, PC (57) ABSTRACT

Embodiments are disclosed relating to an electric power conversion device and methods for controlling the operation thereof. One disclosed embodiment provides an electric power conversion device comprising a first current control mechanism coupled to an electric power source and an upstream end of an inductor, where the first current control mechanism is operable to control inductor current. The electric power conversion device further comprises a second current control mechanism coupled between the downstream end of the inductor and a load, where the second current control mechanism is operable to control how much of the inductor current is delivered to the load.

20 Claims, 5 Drawing Sheets

(56) References Cited

U.S. PATENT DOCUMENTS

| | | | |
|---|---|---|---|
| 2010/0209792 A1 | 8/2010 | Umayahara et al. | |
| 2011/0074373 A1* | 3/2011 | Lin | 323/282 |
| 2011/0089915 A1* | 4/2011 | Qiu et al. | 323/271 |
| 2011/0241644 A1* | 10/2011 | Hashimoto et al. | 323/299 |
| 2012/0074916 A1* | 3/2012 | Trochut | 323/271 |
| 2012/0153907 A1* | 6/2012 | Carobolante et al. | 323/266 |
| 2013/0106500 A1* | 5/2013 | Yin et al. | 327/538 |
| 2013/0162235 A1* | 6/2013 | Harada | 323/283 |
| 2013/0300392 A1* | 11/2013 | Laur et al. | 323/284 |
| 2014/0103889 A1* | 4/2014 | McCune, Jr. | 323/229 |

OTHER PUBLICATIONS

Office Action from Taiwan Patent Application No. 102135978, dated Apr. 29, 2015.

Office Action from Taiwan Patent Application No. 102135978, dated Jan. 15, 2016.

* cited by examiner

```
                                                    ┌─ 400
                                                    ▼
┌─────────────────────────────────────────────────────────────────────────────┐
│ 402 DELIVERING ENERGY FROM A POWER SOURCE TO AN INDUCTOR SO THAT THE AVERAGE │
│ CURRENT FLOWING OUT OF THE DOWNSTREAM END OF THE INDUCTOR IS HIGHER THAN THE │
│ AVERAGE CURRENT NEEDED BY A LOAD THAT IS OPERATIVELY CONNECTED TO THE        │
│ DOWNSTREAM END OF THE INDUCTOR                                               │
└─────────────────────────────────────────────────────────────────────────────┘
                                      │
                                      ▼
┌─────────────────────────────────────────────────────────────────────────────┐
│ 404 CONTROLLING A CURRENT CONTROL MECHANISM OPERATIVELY COUPLED BETWEEN THE  │
│ DOWNSTREAM END OF THE INDUCTOR AND THE LOAD SO AS TO CONTROL HOW MUCH OF THE │
│ CURRENT FLOWING OUT OF THE DOWNSTREAM END OF THE INDUCTOR IS PROVIDED TO     │
│ THE LOAD                                                                     │
│                                                                              │
│        ┌──────────────────────────────────────────────────────┐             │
│        │ 406 SENSING A CHANGE IN CURRENT NEEDED BY LOAD       │             │
│        └──────────────────────────────────────────────────────┘             │
│                 │                                │                           │
│          CURRENT INCREASE              CURRENT DECREASE                     │
│                 ▼                                ▼                           │
│   ┌─────────────────────────┐      ┌─────────────────────────┐             │
│   │ 408 VARY DUTY FACTOR OF │      │ 410 VARY DUTY FACTOR OF │             │
│   │ SWITCHES IN CURRENT     │      │ SWITCHES IN CURRENT     │             │
│   │ CONTROL MECHANISM, E.G.,│      │ CONTROL MECHANISM, E.G.,│             │
│   │ INCREASING THE DUTY     │      │ DECREASING THE DUTY     │             │
│   │ FACTOR OF A SWITCH      │      │ FACTOR OF A SWITCH      │             │
│   │ COUPLED BETWEEN THE     │      │ COUPLED BETWEEN THE     │             │
│   │ DOWNSTREAM END OF THE   │      │ DOWNSTREAM END OF THE   │             │
│   │ INDUCTOR AND THE LOAD   │      │ INDUCTOR AND THE LOAD   │             │
│   │ AND DECREASING THE DUTY │      │ AND INCREASING THE DUTY │             │
│   │ FACTOR OF A SWITCH IN A │      │ FACTOR OF A SWITCH IN A │             │
│   │ CURRENT DISCHARGE PATH  │      │ CURRENT DISCHARGE PATH  │             │
│   │ FROM THE INDUCTOR THAT  │      │ FROM THE INDUCTOR THAT  │             │
│   │ BYPASSES THE LOAD       │      │ BYPASSES THE LOAD       │             │
│   └─────────────────────────┘      └─────────────────────────┘             │
└─────────────────────────────────────────────────────────────────────────────┘
```

CURRENT PARKING RESPONSE TO TRANSIENT LOAD DEMANDS

BACKGROUND

Typical electronic devices, such as microprocessors and the like, may require large changes in input current during operation. As components come "online," current demands may increase dramatically, and similarly, current demands may decrease dramatically as components go "offline." For example, a Graphics Processing Unit ("GPU") may utilize a small amount of current most of the time, but may also require a substantial increase in current as a new frame is generated and the appropriate components are brought into operation. If such demands occur and sufficient power is not available, the voltage provided to the components may drop below a critical voltage, thus potentially effecting undesirable operation. As such, typical electric power conversion devices (e.g., voltage regulators) may utilize one or more energy storage devices, such as capacitors and inductors, in order to ensure that enough energy is available to provide the desired current. However, as the storage devices increase in size, the ability to respond quickly is proportionally diminished.

DETAILED DESCRIPTION

Typical electronic devices, such as computing devices, may be configured to receive electric power from one or more electric power sources. For example, mobile computing devices may be configured to receive electric power from a battery and/or from a mains power system (i.e., "line power"), while other devices may be configured to receive electric power from any one or more other sources (e.g., generator, solar panel, etc.). Regardless of the source of the electric power, the electric power is typically delivered at a particular voltage and frequency, and is typically either delivered as alternating current "AC" or direct current "DC." However, one or more components of a given electronic device may not be configured to directly utilize the provided electric power. For example, although mains electricity in the United States is typically delivered as 120V of alternating current at 60 Hz, a particular electronic device may be configured to utilize 12V DC power. Therefore, the power is converted (e.g., voltage rectified and stepped-down) by various mechanisms, or combination of mechanisms, before being utilized by the electronic device. Accordingly, various approaches utilizing a variety of electric and electronic components exist in order to provide such power conversion.

However, in order to provide a desired output (e.g., desired frequency, voltage, current, phase, etc.), typical electric power conversion devices are configured to operate over a range of operating conditions. For example, electricity demanded by a high-performance electronic device, such as a CPU or GPU, may fluctuate with time. Specifically, as various components of such devices come online (e.g., upon rendering a new frame in a GPU, logic block restarting after a stall, start of a large computation, etc.), there may be a rapid rise in current demand. Similarly, when one or more components go offline (e.g., upon entering a low-power mode), there may be a rapid fall in current demand. As such, typical electric power conversion devices are configured such that the voltage level during either of these instances is within a desired range.

Figure 1:
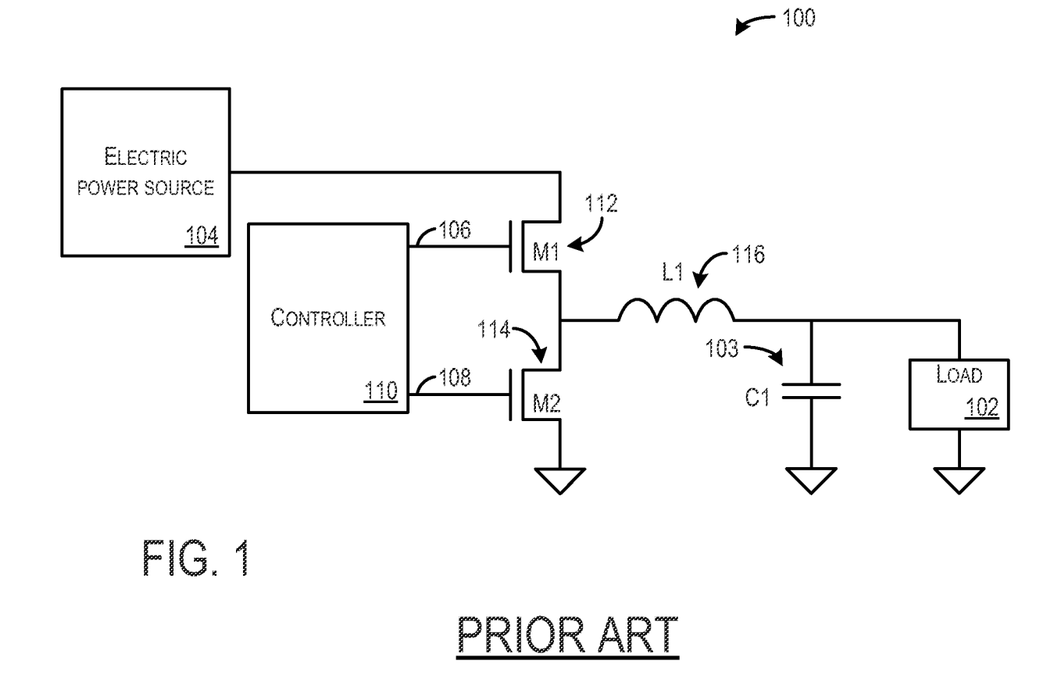
FIG. 1 schematically illustrates a typical electric power conversion device.

Turning now to FIG. 1, a typical power conversion device 100 is shown. Device 100 is configured to provide a desired output (e.g., 1V DC) to load 102 (e.g., logic "blocks," etc.) and capacitor 103 by converting power received from electric power source 104 (e.g., battery, mains power, etc.). For example, by modulating the duty factor of control signals 106 and 108 (e.g., PWM signals, PFM signals, etc.), controller 110 is configured to selectively enable transistors 112 and 114, respectively. In doing so, controller 110 is able to modulate the average current flowing through inductor 116. Specifically, by enabling transistor 112, the instantaneous current flowing through inductor 116 is increased, whereas the instantaneous current is decreased by enabling transistor 114. The difference between the current flowing through the inductor and the load current is accumulated on capacitor 103. Thus, the output voltage provided to load 102 can be controlled by controlling the current through inductor 116.

However, the inductor also resists changes in current, thereby preventing the stored energy in inductor 116 from being released all at once (e.g., to load 102) when load current changes. This property of inductors, along with the storage capacity of capacitor 103, enables an output voltage at load 102 that is sufficiently stable during steady-state operation. Nonetheless, there is some "ripple" in the voltage at load 102 that depends on the size of inductor 116, the size of capacitor 103, and/or the switching frequency of the controller 110, among other factors. Generally speaking, as the size of inductor 116 increases, the output ripple at steady state proportionally decreases. Accordingly, inductor 116 may be sized large enough in order to provide an output voltage that does not fluctuate outside a desired voltage range. However, it will be appreciated that the tendency of inductor 116 to resist a change in current may be undesirable during a rapid increase or decrease in current (referred to as "transients") demanded by load 102.

An example configuration of device 100 (e.g., typical 30 A regulator phase), is as follows. Inductor 116 is 0.5 µH, electric power source 104 provides 12V DC, and the desired output to load 102 is 1V DC. Ignoring the voltage drop across transistor 112 (e.g., due to a small channel resistance) and other non-idealities, the voltage drop across inductor 116 is 11V. As such, the maximum (ideal) current response from inductor 116, defined as the voltage divided by the inductance, is 22 A/µs. Accordingly, providing an extra 10 A of current to load 102 will take at least 500 ns, even ignoring other non-idealities (e.g., time to synchronize control signals 106 and 108 to new demands). While the current being provided is less than the current demanded by load 102, the voltage seen at load 102 will begin to drop as capacitor 103 is discharged by the current difference. If the voltage drops too far, load 102 may operate incorrectly. It will be thus appreciated that such performance may be unsatisfactory in some high-performance electronic devices.

If desired voltage characteristics cannot be satisfied, load 102 may be configured to employ various techniques to deal with the provided voltage. For example, load 102 (e.g., computing device), may be configured to "throttle" performance upon detecting a voltage that is outside, or near an extreme of, the desired voltage range. Throttling may include, for example, halting pending operations, decreasing clock frequency to allow greater time for edge transitions, and/or otherwise decreasing throughput.

The configuration shown in FIG. 1 is typically referred to as a "buck" converter. While the present invention is described in the context of this buck converter, one of ordinary skill in the art will understand that this invention can be applied to other "switch-mode" power conversion circuits including, but not limited to, a forward converter, a half-bridge converter, a full-bridge converter, a flyback converter, and/or variants thereof.

Figure 2:
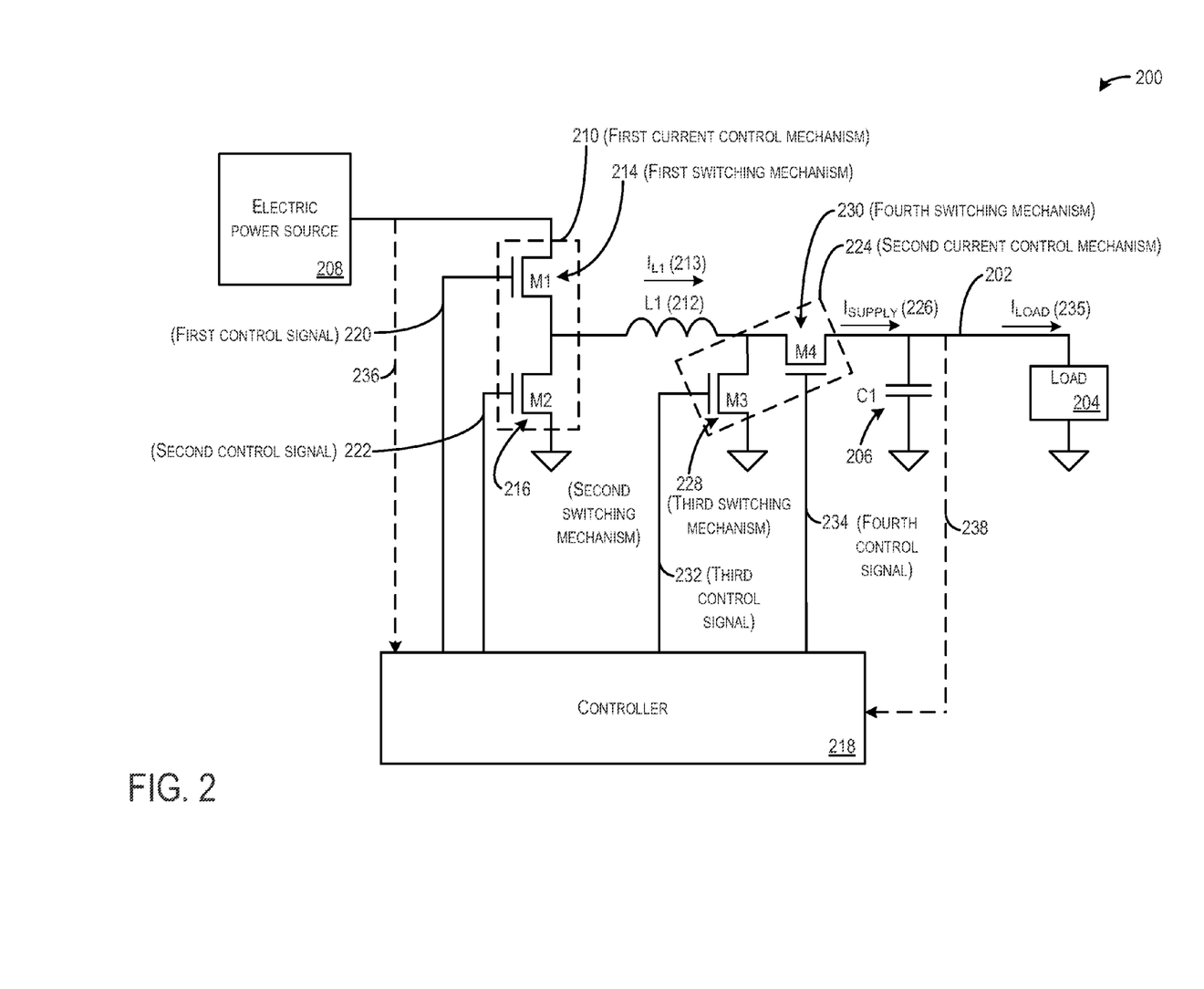
FIG. 2 schematically illustrates an example of an electric power conversion device according to an embodiment of the present disclosure.

FIG. 2 shows an example of an electric power conversion device 200 according to an embodiment of the present disclosure. Device 200 is configured to provide a desired output at node 202 (e.g., at load 204 and capacitor 206) by converting power received from electric power source 208 (e.g., battery, mains power, etc.). Device 200 comprises first current control mechanism 210 coupled to electric power source 208 and an upstream end of inductor 212 (L1). Mechanism 210 is operable to control the average of inductor current 213 ($I_{L1}$) flowing through inductor 212. For example, as illustrated, mechanism 210 may include one or more first switching mechanisms 214 and one or more second switching mechanisms 216. Mechanisms 214 and 216 may each include, for example, n-type power MOSFETs, and/or other switching mechanisms. Although a single mechanism 214 and 216 is illustrated for the ease of understanding, it will be appreciated that a plurality of mechanisms 214 and/or 216 may be connected in parallel to increase current capacity, decrease conduction losses, etc.

Device 200 further includes controller 218 configured to apply one or more control signals to the first current control device. For example, controller 218 may be configured to provide first control signal 220 and second control signal 222 to mechanism 214 and mechanism 216, respectively. For example, control signals 220 and 222 may include PWM ("Pulse Width Modulation") or PFM ("Pulse Frequency Modulation) signals, a combination of PWM and PFM, and/or different control signals, in order to selectively enable mechanisms 214 and 216. Regardless of the specific configuration, controller 218 is configured to provide control signals 220 and 222 such that both mechanisms 214 and 216 are not concurrently enabled. Such a scenario would result in a substantially zero-resistance path between the supply of electric power source 208 and ground, thereby potentially damaging device 200 and/or resulting in unsuitably high power usage.

In contrast to the device 100 of FIG. 1, device 200 further comprises second current control mechanism 224 coupled between the downstream end of inductor 212 and load 204. In contrast to the first current control mechanism 210, the second current control mechanism 224 is operable to control how much of inductor current 213 flowing out of the downstream end of inductor 212 is delivered via supply current 226 ($I_{SUPPLY}$) to capacitor 206, and hence to load 204. As such, second current control mechanism 224 includes one or more third switching mechanisms 228 (e.g., one or more parallel-connected planar MOSFETs) and one or more fourth switching mechanisms 230 (e.g., one or more parallel-connected planar MOSFETs). In contrast to mechanisms 214 and 216, the voltage across mechanisms 228 and 230 may be substantially less. For example, the voltage supplied at the downstream of inductor 212 may be substantially equivalent to the output voltage at the load. As mechanisms 228 and 230 are therefore switching a lesser voltage, mechanisms 228 and 230 may be constructed from lower-voltage devices, such as "planar" MOS transistors, as compared to mechanisms 214 and 216. Such mechanisms may be faster than mechanisms 214 and 216, thereby decreasing switching losses, and may also be incorporated onto an integrated circuit, thereby potentially reducing space used and/or reducing cost due to the lack of discrete components. For example, mechanisms 228 and 230 may be realized on the same integrated circuit as load 204, may be integrated on a separate die or dice on the same package as load 204, or may be integrated on a separate package. The mechanisms may be realized as standard-voltage "core" transistors in a typical digital integrated-circuit process, or the mechanisms may be realized as higher-voltage thick-oxide input-output transistors in a typical digital integrated-circuit process. In a preferred embodiment, switching mechanism 230 is a p-type planar MOSFET and switching mechanism 228 is an n-type planar MOSFET. However, one of ordinary skill in the art will understand that either type of MOSFET may be used for either mechanism with appropriate gate-drive circuitry without departing from the scope of the present disclosure.

Controller 218 may be further configured to apply one or more control signals to the second current control mechanism. For example, the controller may be configured to provide third control signal 232 and fourth control signal 234 to third switching mechanisms 228 and fourth switching mechanisms 230, respectively. As with signals 220 and 222, signals 232 and 234 may utilize PWM, PFM, and/or any other suitable control schema in order to selectively enable mechanisms 228 or mechanisms 230. In some embodiments, signals 232 and 234 may be at least partially synchronous with signals 220 and 222. In other embodiments, the signals may be provided asynchronously. Furthermore, signals 228 and 230 may be provided (e.g., modulated) at a different frequency than signals 220 and 222 in some embodiments.

Regardless of the specific configuration of the control signals, controller 218 may be configured to selectively enable third switching mechanisms 228 and disable fourth switching mechanism 230 to disable supply current 226. Specifically, by enabling mechanisms 228, all of the instantaneous inductor current 213 flowing through inductor 212 is diverted through mechanisms 228 to ground instead of being delivered to capacitor 206. Conversely, by enabling fourth switching mechanisms 230 and disabling third switching mechanism 228, substantially all of the instantaneous inductor current 213 flowing through inductor 212 (minus transistor conduction losses, inductor winding resistance, etc.) is provided to capacitor 206. The duty factor (D) of mechanism 230 determines the fraction of inductor current ($I_L$) in inductor 212 that on average is supplied to capacitor 206. In turn, capacitor 206 smoothes the square wave supply current 226 waveform to generate load current 235 ($I_{LOAD}$) according to the duty factor and the inductor current, as follows: $I_{LOAD} = D \times I_L$. As with mechanisms 214 and 216, control signals 232 and 234 are provided such that both mechanisms 228 and 230 are not concurrently enabled to avoid a short circuit across capacitor 206.

Until a need for a current transient is anticipated (e.g., during steady-state operation), device 200 operates in a manner substantially similar to device 100. That is, mechanism 228 is disabled and mechanism 230 is enabled such that substantially all of inductor current 213 is provided to node 220 as supply current 226. Further, mechanisms 214 and 216 (e.g., "switches") are selectively enabled ("switched") in order to control current 213, and hence the voltage seen by load 204. In this way, if the load voltage is constant, supply current 226 is substantially equivalent to the inductor current.

Figure 5:
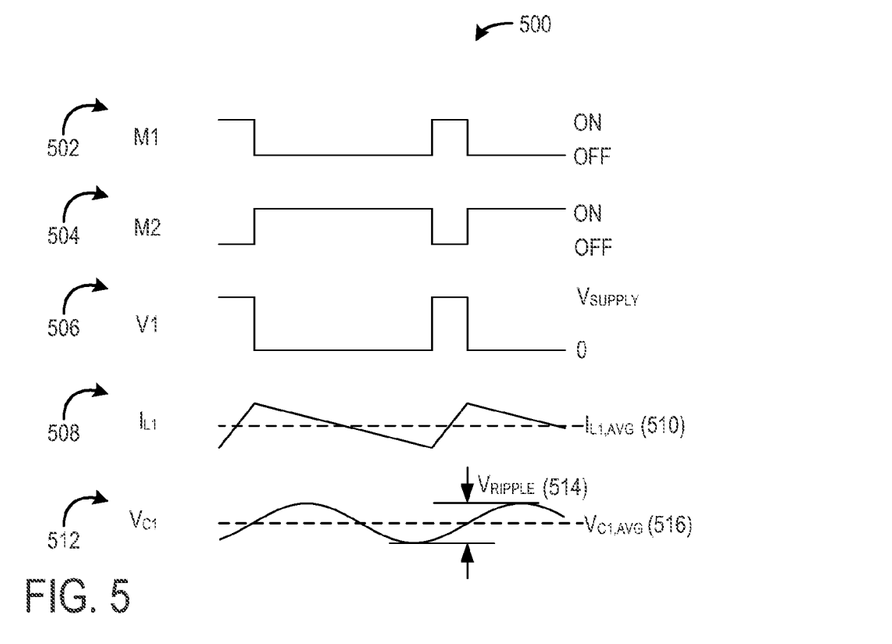
FIGS. 5 and 6 illustrate example time-domain responses of the example electric power conversion device of FIG. 2.

Briefly turning now to FIG. 5, an example time-domain response 500 is shown for device 200 in steady-state operation. As illustrated, FIG. 5 includes waveforms 502 and 504 illustrating the response of mechanisms 220 ("M1") and 222 ("M2"), respectively (e.g., response effected by time-varying control signals 220 and 222). Specifically, waveforms 502 and 504 alternate between complementary "ON" and "OFF" states. Waveform 506 in turn illustrates the voltage ("V1") at the upstream end of inductor 212 that is controlled by the switching of mechanisms 220 and 222. As described above and as illustrated by waveform 506, voltage V1 is high (nominally equal to $V_{SUPPLY}$) when first switching mechanism 214 is in an "ON" state, and is low (nominally 0V) when second switching mechanism 216 is an "ON" state. For example, when mechanism 214 is "ON" (i.e., conducting), mechanism 214 ideally provides a zero-resistance path between the output from electric power source 208 and the upstream end of inductor 212. Similarly, when mechanism 216 is "ON," mechanism 216 ideally provides a zero-resistance path between the upstream end of inductor 212 and ground. Therefore, waveform 506 toggles between a first state where voltage V1 is substantially equivalent to the input voltage and a second state where voltage V1 is substantially zero (i.e., at ground).

Continuing with response 500, waveform 508 illustrates the time-domain response of inductor current 213 in inductor 212. As inductors resist changes in current, waveform 508 slowly "ramps up" when mechanism 214 is enabled, and slowly "ramps down" when mechanism 216, thereby potentially producing the illustrated sawtooth waveform 508. Waveform 508 is further illustrated with a representation 510 of the average inductor current 213 provided by the sawtooth waveform.

Finally, FIG. 5 further includes waveform 512 illustrating the response of the voltage ("VC1") at output node 202 (e.g., voltage across capacitor 206 and seen by load 204). Specifically, as current 213 increases in inductor 212, charge accumulates on capacitor 206, thereby inducing a voltage across the capacitor. As current 213 ramps down, capacitor 206 supplies the accumulated charge to power the load, and thus the voltage VC1 decreases as the charge is depleted. As capacitor 206 oscillates between these "charged" and "depleted" states, voltage ripple 514 about average voltage 516 is produced. As previously mentioned, the size of capacitor 206 may be increased, and/or other adjustments may be made, in order to decrease ripple 514.

In the above-described operating mode, it will be appreciated that the ability of device 200 to respond to transients is similar to that of device 100. Namely, the size of the inductor, and thus the property of resisting changes in current, determines how quickly device 200 can respond to a transient demand.

Returning to FIG. 2, in order to provide improved transient handling, for example, controller 218 and current control mechanism 224 may be configured to control how much of inductor current 213 flowing through inductor 212 is provided to satisfy the operating requirements of load 204. This may be achieved by applying control signals to current control mechanism 224 to place the mechanism into any of a plurality of states. Each such state may be characterized by how much of the available current (i.e., inductor current 213) is provided to the load (e.g., 50%, 80%, etc.). In the depicted configuration, the states may also be characterized by a duty factor used to control one or more switching mechanisms of current control mechanism 224. In other words, a given duty factor may be used to provide a certain percentage of available current, with the duty factor being increased or decreased to respectively increase or decrease the current percentage supplied to the load. The term "states" does not necessarily imply discrete states; in the depicted configuration, the control signals may be controlled to provide any desired percentage of inductor current 213 to the load. This method of operation, in which inductor 212 is charged to provide an available current which is then passed on to the load in a controllable percentage, may be referred to as a "current parking" configuration, or a configuration in which current is "reserved" via inductor 212.

Starting with first current control mechanism 210, current parking may proceed as follows. Current control mechanism 210 is controlled by controller 218 to control the charging of inductor 212 so as to "park" or "reserve" a desired amount of inductor current 213. In the depicted example, this is achieved by controlling the states of switching mechanisms 214 and 216 with signals 220 and 222. The state of the switching mechanisms is rapidly toggled between two states: (1) switch 214 is closed and switch 216 is open—thereby increasing the current in the inductor; and (2) switch 214 is open and switch 216 is closed—thereby decreasing the current in the inductor by applying a voltage opposing the flow of current. Duty factor may be controlled via PWM, PFM or other appropriate schemes to achieve the desired conditions at the downstream end of the inductor. Typically, the control will be performed so that the average of inductor current 213 is greater than the average current needed by the load at steady state operation. This excess energy is stored in inductor 212 in order to rapidly and efficiently respond to transient current demands.

Second current control mechanism 224 is then controlled by signals from controller 218 to provide a desired amount of the parked current to the load. Similar to first current control mechanism 210, the second current control mechanism is rapidly toggled between a state in which inductor current 213 is delivered to the load, and a state in which the inductor current is discharged along a path that bypasses the load (e.g., a path to ground). This toggling is achieved in the depicted example by controlling third switching mechanism 228 and fourth switching mechanism 230 with control signals 232 and 234, respectively. Specifically, load voltage across capacitor 206 is increased by closing switch 230 and opening switch 228; load voltage across capacitor 206 is decreased by opening switch 230 and closing switch 228. By controlling the duty factor of the switches (e.g., via PWM, PFM or other schemes), a desired average percentage of the parked current is provided to the load. As mentioned previously, this duty factor is set so that the average supply current 226 supplied to capacitor 206 is identical to the load current, such that the load current is equal to the duty factor multiplied by the load current and the voltage at node 202 (e.g., voltage across capacitor 206 and hence the load voltage) is held constant.

Figure 6:
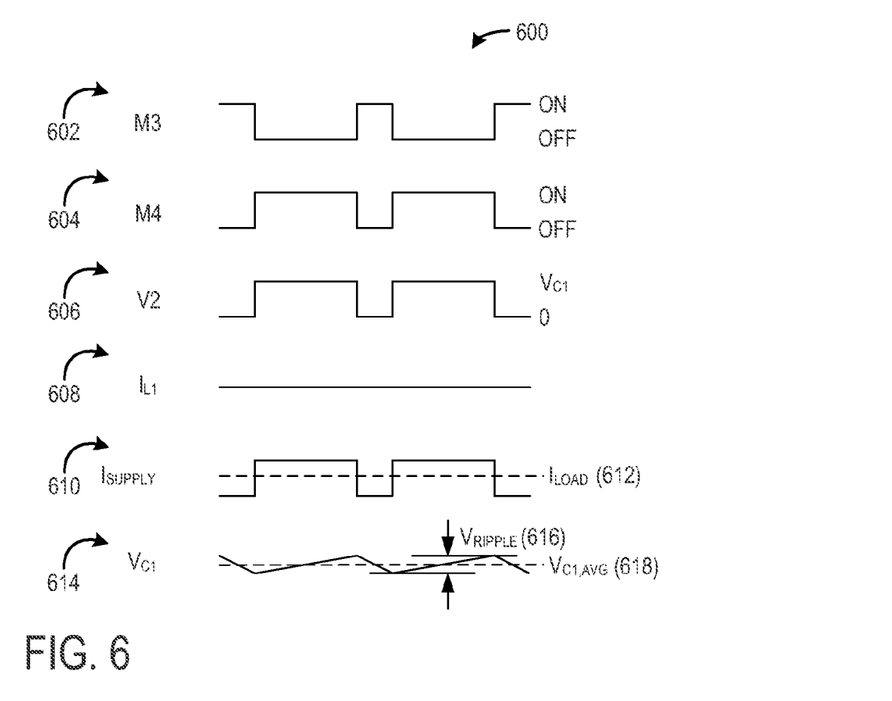

Briefly turning now to FIG. 6, an example time-domain response 600 is shown for device 200 providing "current parking." As illustrated, FIG. 6 includes waveforms 602 and 604 illustrating the response of mechanisms 228 ("M3") and 230 ("M4"), respectively (e.g., response effected by time-varying control signals 232 and 234). Specifically, waveforms 602 and 604 alternate between complementary "ON" and "OFF" with a particular duty factor in order to set the voltage ("V2") at the downstream end of inductor 212.

Waveform 606 in turn illustrates voltage V2, which is high (nominally equal to VC1) when first switching mechanism 214 is in an "ON" state, and low (nominally zero) when fourth switching mechanism 230 is an "ON" state. For example, when mechanism 230 is "ON" (i.e., conducting), mechanism 230 ideally provides a zero-resistance path between the upstream end of inductor 212 and node 202. Similarly, when mechanism 228 is "ON," mechanism 228 ideally provides a zero-resistance path between the upstream end of inductor 212 and ground. Therefore, waveform 606 toggles between a first state where voltage V2 is substantially equivalent to the output voltage (e.g., voltage "VC1" across capacitor 206) and node 202 and a second state where voltage V2 is substantially zero (i.e., at ground).

As illustrated by waveform 608, inductor current 213 may be maintained at a constant level (e.g., by controlling first current control mechanism 214). However, by switching second current control mechanism 224 according to the schema illustrated by waveforms 602 and 604, a load current may be provided that is less than the inductor current. Accordingly, waveform 610 illustrates the response of supply current 226. When fourth switching mechanism 230 is conducting, supply current 226 may be substantially equivalent to inductor current 213 (e.g., less leakage currents, etc.). Similarly, when third switching mechanism 228 is conducting, supply current may be substantially zero. Load current 235 ($I_{LOAD}$), as illustrated at 612, is an intermediate value between the extremes of supply current 226. In the periodic steady state, the load current is equivalent to the average of the supply current.

Finally, response 600 includes waveform 614 illustrating the response of the voltage ("VC1") at output node 202 (e.g., voltage across capacitor 206 and seen by load 204). Specifically, when mechanism 230 is ON and inductor current is larger than load current, charge accumulates on capacitor 206, thereby increasing the voltage across the capacitor. When mechanism 228 is ON, capacitor 206 supplies the accumulated charge to power the load without receiving any input current, and thus the voltage VC1 decreases as the charge is depleted. As capacitor 206 oscillates between these "charged" and "depleted" states, a saw-tooth voltage ripple 616 about average voltage 618 is produced. Due to the toggling of fourth switching mechanism 230, waveform 614 comprises a sawtooth shape in contrast to the sinusoidal ripple 514 illustrated in FIG. 5.

From the above discussion, it will be appreciated that by producing an excess current and selectively controlling its delivery, the depicted configuration can rapidly respond to transient current demands from the load. Without the depicted configuration, response time would be much slower due to the time required to vary the current through the inductor. Specifically, the ability of device 200 to respond to transients is substantially determined by the switching speed of mechanisms 228 and 230. The presence of this very fast control loop alleviates concerns about the slow control loop used to control the inductor current. Accordingly, inductor 212 can be sized in order to provide the desired amount of parked current without concern for the ability of the inductor to respond rapidly to current transients. Varying the duty factor at current control mechanism 224 is more or less instantaneous, and in any case is dramatically faster than creating a variation in the inductor current. Further, as mentioned above, it will be appreciated that the lower voltages on the downstream side of the inductor may allow use of transistor types that provide relatively faster switching as compared to transistors of the first current control mechanism. For example, the lower voltages may allow use of planar transistors so as to provide, for example, a control response in the neighborhood of 1 to 10 ns. Such a response may be substantially quicker than the response of inductor 212 (e.g., 500 ns for a 0.5 µH inductor to provide an extra 10 A of current). In some embodiments, such a control response may be made faster than the resonant frequency of a typical integrated circuit package. Further, the ability to quickly switch mechanisms 228 and 230 may also enable the size of capacitor 206 to be reduced, often by several orders of magnitude. Therefore, in many cases, the capacitor is small enough such that it may be realized entirely on the integrated-circuit package.

In one embodiment of the present invention, current control mechanism 224 is controlled by a periodic control method, such as PWM, PFM, etc. or some combination thereof. In this case, the time to respond to a change in load current may be as large as one period of the periodic control (e.g., 10 ns for a 100 MHz control). In other embodiments, the current control mechanism may be switched near-instantaneously (i.e., turn mechanism 230 on and turn mechanism 228 off) to supply current to the load as soon as increased load current (and/or reduced load voltage) is sensed. In other words, in such embodiments, device 200 may be able to respond to changes in demand as fast as controller 218 is able to detect the need for more current and switch mechanisms 230 and 228. In such embodiments, the response may typically take less than ins, depending on the sensing mechanism.

In addition to an increased demand for current by load 204, device 200 may be further configured to respond to a decreased demand for current by load 204 (i.e., a negative current transient). Specifically, when load 204 stops consuming current or consumes a lesser amount of current, controller 218 can respond substantially instantaneously by reducing the duty factor(s) employed at switching mechanisms 228 and 230.

It will be appreciated that, in other embodiments, device 200 may comprise a single "phase" of a multi-phase electric power conversion device. In such scenarios, additional current may be provided at node 202 by one or more other phases. In other words, each individual phase may be configured to provide a subset of the overall current (e.g., each phase provides a portion of the current at a different phase), thereby potentially decreasing the size (e.g., due to decreased power handling) of various components of the electric power conversion device.

However, various configurations including multiple phases are possible. For example, in some embodiments, a first phase may provide typical voltage conversion (e.g., via device 100 of FIG. 1) during "conventional" device operation. The second phase may have a configuration similar to that of device 200, and the second phase may normally operate by parking all the current in the corresponding inductor without delivering any current to the load. Upon recognizing an increased current demand, the second phase may be operable to provide the parked current to the load until the transient subsides, and may then return to the previous operating mode. It will be appreciated that these scenarios are presented for the purpose of example and that one or more stages of a multi-phase electric power conversion device may utilize current parking according to additional and/or different schemas and via various circuit topologies without departing from the scope of the present disclosure.

In order to provide the above-described current delivery and response, controller 218 may be configured to monitor various components and/or nodes of device 200. For example, controller 218 may be configured to receive node voltage 236 (e.g., voltage input from electric power source 208) and/or node voltage 238 (e.g., output voltage at node 202). Controller 218 may incorporate such information into one or more control loops and/or different logic in order to effect modulation of control signals 220, 222, 228, and 230. In some embodiments, controller 218 may be configured to estimate one or more currents (e.g., inductor current 213, load current 235, etc.) from the measured voltage(s). In other embodiments, controller 218 may be configured to measure one or more currents via various current sensing mechanisms. It will be appreciated that these scenarios are presented for the purpose of example, and controller 218 may be configured to measure and/or estimate any one or more voltages and/or currents within device 200 in order to provide such modulation without departing from the scope of the present disclosure.

However, it will be appreciated that by simply monitoring other components of device 200, controller 218 may not detect future current demands sufficiently ahead-of-time in order to park current in inductor 212. Thus, in some embodiments, controller 218 may be configured to provide "parked" current all the time in order to ensure that the demanded current is always available. However, as current parking effects some power losses (e.g., due to switching losses, "on" resistance across transistor channels, etc.), such a configuration may not provide suitable performance in some scenarios (e.g., mobile device scenarios or other low-power applications).

As such, in other embodiments, controller 218 may utilize one or more learning mechanisms in order to anticipate future demands. For example, controller 218 may learn that the current demanded from load 204 drops substantially below an average observed load current immediately preceding a large increase in demand. For example, if load 204 is a GPU, the load current demand may drop substantially in an idle period before a new frame is rendered. Accordingly, upon detecting such a drop-off in current, controller 218 may be configured to park current in inductor 212 according to previously-observed current demands. Thus, when rendering occurs and the appropriate components are brought online, suitable current is available. It will be appreciated that such scenarios are presented for the purpose of example, and are not intended to be limiting in any manner.

However, in some embodiments, it may be desirable to provide more intelligent control over the operation of device 200. For example, turning now to FIG. 3, an electronic device 300 (e.g., computing device) comprising an electric power conversion device 302 according to an embodiment of the present disclosure (e.g., electric power conversion device 200) is illustrated. In some embodiments, device 300 may include electric power source 304 (e.g., internal battery) and/or may be operatively coupled to one or more external electric power sources 306 (e.g., mains power).

Figure 3:
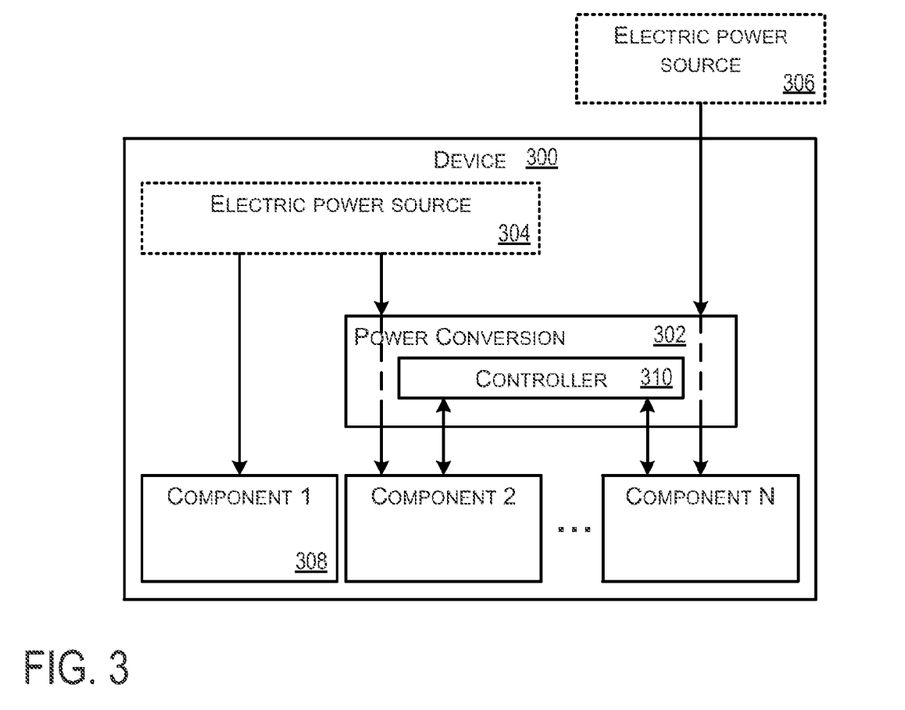
FIG. 3 schematically illustrates an example electronic device comprising an electric power conversion device according to an embodiment of the present disclosure.

Device 300 comprises a plurality of components 308, illustrated as an arbitrary number N of components (e.g., logic blocks, discrete components, etc.). Some components of device 300, for example "Component 1," may be configured to interface directly with one or more of electric power source 304 and 306. Component 1, for example, may be configured to operate from the voltage supplied by the power source(s) and/or may include one or more internal regulation mechanisms. Other components of device 300, for example "Component 2" may be operatively coupled to power conversion device 302. In addition to receiving electric power from device 302, such components may be configured to interact with controller 310 (e.g., controller 218) of electric power conversion device 302. For example, controller 310 may be configured to monitor one or more nodes of the components in order to anticipate future current demands in a manner similar to the monitoring the "local" nodes described above in reference to FIG. 2. In other words, a change in node voltage or current may provide a "trigger" to controller 310 in order to effect current parking within electric power conversion device 302.

In some embodiments, the components 308 interacting with controller 310 may be configured to provide a trigger (e.g., one or more signals) to controller 310 alerting the controller of future current demands. For example, upon leaving a low-power mode, one or more components 308 may be configured to provide a signal to controller 310 alerting the controller that an increase in load current may soon be needed. Accordingly, controller 310 may be configured to start parking current upon receipt of such trigger. As another non-limiting example, one or more components 308 (e.g., processing pipeline component(s)) may be configured to provide a signal to the controller upon receipt a particular architectural instruction within a processing pipeline, such as the fetching of a floating point instruction, that will require idle execution mechanisms to come online in a few clock cycles.

It will be appreciated that these triggers are presented for the purpose of example, and that the electric power conversion device described by example hereto may be configured to respond to any suitable trigger, or combination of triggers, without departing from the scope of the present disclosure.

Figure 4:
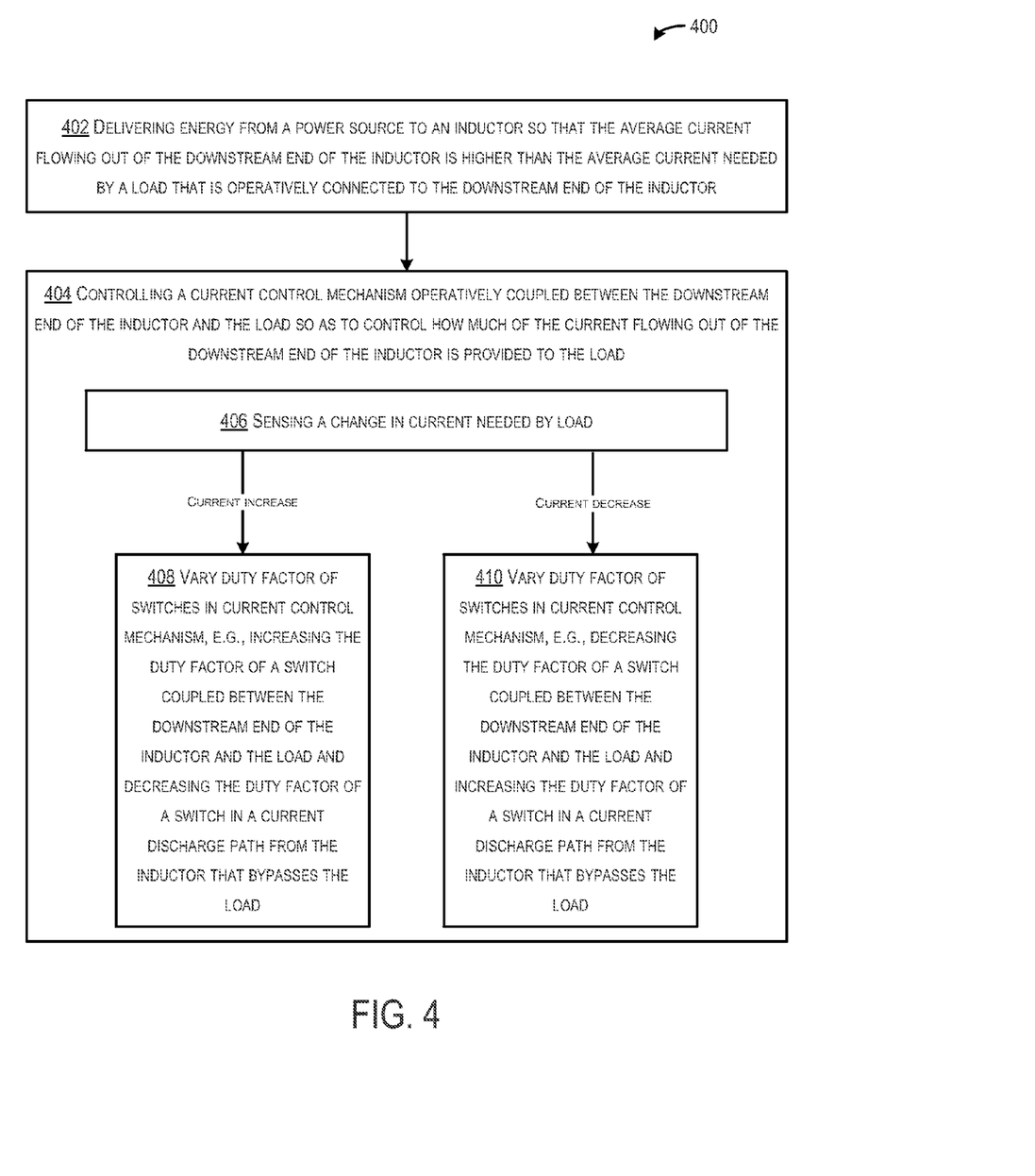
FIG. 4 illustrates a process flow depicting an embodiment of a method for operating an electric power conversion device.

Turning now to FIG. 4, an example method for providing power to a load, such as a piece of computing logic, and for responding to transient current demands of the load is illustrated. As shown at 402, the method includes delivering energy from a power source to an inductor so that the average current flowing in an inductor is higher than the average current needed by a load that is operatively connected to the downstream end of the inductor. At 404, the method further includes using a current control mechanism to control how much of the inductor current is delivered to the load. The amount of current passed to the load may be none, some or all of the available inductor current. As described above, the available inductor current may be referred to as "parked" or "reserved" current, which alludes to the characteristic that this current is in excess of the average current needed by the load, the excess being available for use in the event of a future transient increase in the amount of current needed by the load.

As in the above hardware examples, the inductor may be charged using a current control mechanism having switches that are duty-cycle-controlled (e.g., via PWM, PFM, etc.) to achieve the desired inductor current and/or voltage. Further, a current control mechanism, such as mechanism 224 (FIG. 2), may be employed to control how much of the parked inductor current is passed along to the load. That said, it will be appreciated that inductor charging, controlled transmission of inductor current, and/or any other functionality described in method 400 may be achieved using hardware other than that described above.

Variation in the amount of delivered current may be precipitated by recognizing (sensing) a change in the amount of current needed by the load. This may be an implicit sensing resulting from a voltage drop or other sensed phenomena at the node between the inductor and the load. Alternatively, or additionally, another component or process may signal a controller to indicate that current demands are about to change. The recognizing of a change in the amount of current needed by the load is shown in the example method at 406.

Steps 408 and 410 depict an example of responding, respectively, to an increased demand for load current and a decreased demand for load current. These examples suppose a switching arrangement in which a duty factor is varied to satisfy the need for a different amount of current. At 408, an increased need is provided by increasing the duty factor of a switch coupled between the downstream end of the inductor and the load, and decreasing the duty factor of a switch in a current discharge path from the inductor that bypasses the load. In other words, the duty factors of the switches are varied so that more of the parked current is delivered to the load, and less of the parked current is dumped to ground. Alternatively, at 410, a negative current transient (reduced need) is serviced by decreasing the duty factor of the switch between the inductor and the load, and by increasing the duty factor that couples the inductor current into the discharge path.

Aspects of this disclosure have been described by example and with reference to the illustrated embodiments listed above. Components that may be substantially the same in one or more embodiments are identified coordinately and are described with minimal repetition. It will be noted, however, that elements identified coordinately may also differ to some degree. The claims appended to this description uniquely define the subject matter claimed herein. The claims are not limited to the example structures or numerical ranges set forth below, nor to implementations that address the herein-identified problems or disadvantages of the current state of the art.

The invention claimed is:

1. An electronic circuit, comprising:
   a first current control mechanism coupled between an electric power source and an upstream end of an inductor;
   a second current control mechanism coupled between a downstream end of the inductor and a load;
   a capacitor coupled between the second current control mechanism and the load; and
   a controller circuit configured to:
   control the first current control mechanism to generate a current in the inductor;
   control the second current control mechanism to provide a first portion of the current to the load and a second portion of the current to the capacitor in a first state to accumulate a charge on the capacitor; and
   control the second current control mechanism to receive a reserve current generated by the capacitor in a second state by discharging the charge accumulated on the capacitor, wherein the current generated in the inductor is diverted to ground by a first transistor that is directly coupled between the downstream end of the inductor and the ground when the second current control mechanism is in the second state.

2. The electronic circuit of claim 1, wherein the second current control mechanism comprises a second transistor that is coupled between the downstream end of the inductor and the capacitor and the second transistor is controlled to enable and disable a flow of the current to the capacitor.

3. The electronic circuit of claim 1, wherein a ripple of a voltage at the load is based on a size of the capacitor.

4. The electronic circuit of claim 1, wherein a control response time of the second current control mechanism is lower than a response time of the inductor.

5. The electronic circuit of claim 4, wherein the control response time of the second current control mechanism is 1-10 nanoseconds.

6. The electronic circuit of claim 1, wherein the capacitor and the load reside within an integrated circuit package and the first current control mechanism is not included in the integrated circuit package.

7. The electronic circuit of claim 1, wherein the second current control mechanism and the load are integrated within a single die and the first current control mechanism is not integrated into the single die.

8. The electronic circuit of claim 1, wherein the first current control mechanism comprises transistors that are fabricated within a semiconductor die to include a higher-voltage gate oxide than a gate oxide of transistors comprising the load.

9. The electronic circuit of claim 1, wherein the second current control mechanism comprises planar metal-oxide semiconductor field-effect transistor (MOSFET) devices.

10. The electronic circuit of claim 9, wherein the first current control mechanism comprises power MOSFET devices.

11. The electronic circuit of claim 1, wherein an average current at the downstream end of the inductor is higher than an average current needed by the load.

12. The electronic circuit of claim 1, wherein the controller circuit is further configured to anticipate future current demands by monitoring a voltage provided to the first current control mechanism.

13. A method of controlling current delivered to a load, comprising:
   controlling a first current control mechanism that is coupled between an electric power source and an upstream end of an inductor to generate a current in the inductor,
   controlling the second current control mechanism to provide a first portion of the current to the load and a second portion of the current to the capacitor in a first state to accumulate a charge on the capacitor; and
   controlling the second current control mechanism to receive a reserve current generated by the capacitor in a second state by discharging the charge accumulated on the capacitor, wherein the current generated in the inductor is diverted to ground by a first transistor that is directly coupled between the downstream end of the inductor and the ground when the second current control mechanism is in the second state.

14. The method of claim 13, wherein the second current control mechanism comprises a second transistor that is coupled between the downstream end of the inductor and the capacitor and the second transistor is controlled to enable and disable a flow of the current to the capacitor.

15. The method of claim 13, wherein a ripple of a voltage at the load is based on a size of the capacitor.

16. The method of claim 13, wherein a control response time of the second current control mechanism is lower than a response time of the inductor.

17. The method of claim 16, wherein the control response time of the second current control mechanism is 1-10 nanoseconds.

18. The method of claim 13, wherein the capacitor and the load reside within an integrated circuit package and the first current control mechanism is not included in the integrated circuit package.

19. The method of claim 13, wherein the second current control mechanism and the load are integrated within a single die and the first current control mechanism is not integrated into the single die.

20. The method of claim 13, wherein the first current control mechanism comprises transistors that are fabricated within a semiconductor die to include a higher-voltage gate oxide than a gate oxide of transistors comprising the load.

* * * * *